US012611833B2

(12) United States Patent
Li

(10) Patent No.: US 12,611,833 B2
(45) Date of Patent: Apr. 28, 2026

(54) DETECTION DEVICE AND ELECTRODE PLATE CALENDERING APPARATUS

(71) Applicant: CONTEMPORARY AMPEREX TECHNOLOGY (HONG KONG) LIMITED, Hong Kong (CN)

(72) Inventor: Jian Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 388 days.

(21) Appl. No.: 18/340,309

(22) Filed: Jun. 23, 2023

(65) Prior Publication Data

US 2023/0330957 A1     Oct. 19, 2023

Related U.S. Application Data

(63) Continuation of application No. PCT/CN2022/097726, filed on Jun. 8, 2022.

(30) Foreign Application Priority Data

Jul. 26, 2021    (CN) ......................... 202121709796.X

(51) Int. Cl.
| | |
|---|---|
| *G01L 5/00* | (2006.01) |
| *B30B 9/28* | (2006.01) |
| *H01M 4/04* | (2006.01) |

(52) U.S. Cl.
CPC ................. *B30B 9/28* (2013.01); *G01L 5/00* (2013.01); *H01M 4/0435* (2013.01)

(58) Field of Classification Search
CPC ... G01L 1/2225; G01L 1/2218; G01L 5/0085; G01L 5/045; G01L 5/107; G01L 5/108;
(Continued)

(56) References Cited

U.S. PATENT DOCUMENTS

| | | | | | |
|---|---|---|---|---|---|
| 4,289,005 | A | * | 9/1981 | Cabaret | ................. G01B 7/345 73/159 |
| 4,309,902 | A | * | 1/1982 | Sano | ....................... B21B 38/02 73/159 |

(Continued)

FOREIGN PATENT DOCUMENTS

| | | |
|---|---|---|
| CN | 101762316 A | 6/2010 |
| CN | 106252606 A | 12/2016 |

(Continued)

OTHER PUBLICATIONS

The World Intellectual Property Organization (WIPO) International Search Report and Written Opinion for PCT/CN2022/097726 Aug. 15, 2022 16 Pages (including translation).
(Continued)

*Primary Examiner* — Tran M. Tran
(74) *Attorney, Agent, or Firm* — ANOVA LAW GROUP, PLLC

(57) ABSTRACT

A detection device includes a passing roller, a measurement unit, and a processing module. The passing roller is configured for the electrode plate to pass over. The measurement unit is disposed on the passing roller, and is configured to measure a pressure acting on the passing roller by the electrode plate. The processing module is configured to judge whether the electrode plate is qualified according to the pressure measured by the measurement unit.

14 Claims, 4 Drawing Sheets

(58) Field of Classification Search
CPC .......... G01B 21/30; G01B 7/34; G01B 7/345;
G01B 7/281; B21B 38/02; B21B 38/08;
H01M 4/0435
See application file for complete search history.

(56) References Cited

U.S. PATENT DOCUMENTS

| | | | | |
|---|---|---|---|---|
| 4,356,714 | A * | 11/1982 | Quehen | B21B 38/02 |
| | | | | 72/31.07 |
| 4,422,889 | A * | 12/1983 | Trezeguet | G02B 6/4407 |
| | | | | 156/48 |
| 4,429,446 | A * | 2/1984 | Lehmann | D21G 1/022 |
| | | | | 72/241.6 |
| 4,836,680 | A * | 6/1989 | Troster | G01B 11/16 |
| | | | | 356/613 |
| 5,033,317 | A * | 7/1991 | Van Haag | F16C 19/52 |
| | | | | 73/862.541 |
| 5,146,790 | A * | 9/1992 | Fish | G01L 3/102 |
| | | | | 73/779 |
| 5,379,631 | A * | 1/1995 | Kira | B21B 38/02 |
| | | | | 72/11.1 |
| 5,557,100 | A * | 9/1996 | Jeuniaux | G01L 5/105 |
| | | | | 356/429 |
| 5,592,875 | A * | 1/1997 | Moschel | D21F 3/06 |
| | | | | 100/153 |
| 6,138,506 | A * | 10/2000 | Neuschutz | B21B 38/02 |
| | | | | 73/818 |
| 6,302,834 | B2 * | 10/2001 | White | B21B 37/36 |
| | | | | 100/153 |
| 6,339,962 | B1 * | 1/2002 | Scheuter | G01L 1/2218 |
| | | | | 73/796 |
| 6,354,013 | B1 * | 3/2002 | Mucke | B21B 38/02 |
| | | | | 33/501.02 |
| 6,433,499 | B1 * | 8/2002 | Cote | B65H 23/044 |
| | | | | 318/434 |
| 6,722,194 | B2 * | 4/2004 | Malard | G01L 5/045 |
| | | | | 73/159 |
| 6,853,927 | B2 * | 2/2005 | Noe | G01L 5/10 |
| | | | | 702/41 |
| 6,988,398 | B2 * | 1/2006 | Saloniemi | B65H 23/0204 |
| | | | | 73/159 |
| 7,155,097 | B2 * | 12/2006 | Jakobsen | G02B 6/2551 |
| | | | | 385/127 |
| 7,225,652 | B2 * | 6/2007 | Russo | G01B 7/345 |
| | | | | 72/9.1 |
| 7,444,862 | B2 * | 11/2008 | Innala | G01L 5/10 |
| | | | | 73/159 |

| | | | | |
|---|---|---|---|---|
| 8,127,629 | B2 * | 3/2012 | Leigh | G01L 3/108 |
| | | | | 73/866.5 |
| 8,474,333 | B2 * | 7/2013 | Berendes | G01L 1/246 |
| | | | | 73/862.55 |
| 9,097,595 | B2 * | 8/2015 | Moore | G01L 5/045 |
| 9,440,270 | B2 * | 9/2016 | Thiel | G01L 5/045 |
| 9,745,698 | B2 * | 8/2017 | Schmitt | G01L 5/107 |
| 9,784,574 | B2 * | 10/2017 | Noe | G01B 21/30 |
| 10,343,868 | B2 * | 7/2019 | Liang | B65H 27/00 |
| 10,370,795 | B2 * | 8/2019 | Figiel | D21G 9/0045 |
| 11,235,365 | B2 * | 2/2022 | Bouby | G01B 21/30 |
| 11,495,783 | B2 * | 11/2022 | Kim | B21B 37/16 |
| 11,629,461 | B2 * | 4/2023 | Figiel | D21G 9/0036 |
| | | | | 702/41 |
| 11,777,072 | B2 * | 10/2023 | Wu | H01M 4/0435 |
| | | | | 118/110 |
| 11,959,888 | B2 * | 4/2024 | Dai | G01L 1/242 |
| 12,076,769 | B2 * | 9/2024 | Magne | G01L 1/246 |
| 12,311,422 | B2 * | 5/2025 | Kremeyer | B21B 38/08 |
| 2002/0178840 | A1 * | 12/2002 | Malard | G01B 7/345 |
| | | | | 73/862.391 |
| 2002/0194925 | A1 * | 12/2002 | Grefve | G01L 5/10 |
| | | | | 73/760 |
| 2005/0098289 | A1 * | 5/2005 | Pitkanen | D21F 3/06 |
| | | | | 162/263 |
| 2007/0006644 | A1 * | 1/2007 | Schultheis | G01L 5/045 |
| | | | | 73/159 |
| 2010/0125428 | A1 | 5/2010 | Moore | |
| 2023/0125899 | A1 * | 4/2023 | Kim | H01M 4/0404 |
| | | | | 29/730 |
| 2024/0383712 | A1 * | 11/2024 | So | B30B 15/26 |

FOREIGN PATENT DOCUMENTS

| | | |
|---|---|---|
| CN | 209559386 U | 10/2019 |
| CN | 213660453 U | 7/2021 |
| CN | 215262190 U | 12/2021 |
| EP | 1493565 A2 | 1/2005 |
| EP | 3550637 A2 | 10/2019 |

OTHER PUBLICATIONS

State Intellectual Property Office of China Notice of Grant of Invention Patent Right for Application No. 202121709796.X Nov. 24, 2021 2 pages (including translation).
The European Patent Office (EPO) The Extended European Search Report for Application No. 22848051.3, Jul. 12, 2024 9 Pages.
The Mexican Institute of Industrial Property Notification of 1st Substantive Requirement for Application No. MX/a/2023/007081 Jan. 1, 13, 2026 12 pages (including translation).

* cited by examiner

100

30

DETECTION DEVICE AND ELECTRODE PLATE CALENDERING APPARATUS

CROSS-REFERENCE TO RELATED APPLICATIONS

The present application is continuation of International Application No. PCT/CN2022/097726, filed on Jun. 8, 2022, which claims priority to Chinese patent application no. 202121709796.X, entitled "DETECTION DEVICE AND ELECTRODE PLATE CALENDERING APPARATUS" and filed on Jul. 26, 2021, the entire contents of which are incorporated herein by reference.

TECHNICAL FIELD

The present application relates to the technical field of batteries, and in particular to a detection device and an electrode plate calendering apparatus.

BACKGROUND ART

With a vigorous development of new energy vehicles, lithium-ion batteries have been widely used. An electrode plate is an important part of a lithium-ion battery, and has a coated area coated with an active material and a tab area not coated with an active material. In a manufacturing process of the electrode plate, a roller press calender needs to compress the electrode plate to a certain thickness to increase an energy density per unit volume of the electrode plate, and then tab areas on two sides of the electrode plate are cut to obtain tabs, which are needed for subsequent battery production. However, due to a pressure from a pressure roller during rolling, the electrode plate becomes thinner, and is calendered to some extent in a direction parallel to a travel direction of the electrode plate. At present, due to an unqualified quality of cold-press calendering of the electrode plate, a scrap rate of the batteries produced in the subsequent processing is often high.

SUMMARY

In accordance with the disclosure, there is provided a detection device including a passing roller configured for an electrode plate to pass over, a measurement unit disposed on the passing roller and configured to measure a pressure acting on the passing roller by the electrode plate, and a processing module configured to judge whether the electrode plate is qualified according to the pressure measured by the measurement unit.

BRIEF DESCRIPTION OF THE DRAWINGS

In order to more clearly describe the technical solutions of the embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

LIST OF REFERENCE SIGNS

Figure 1:
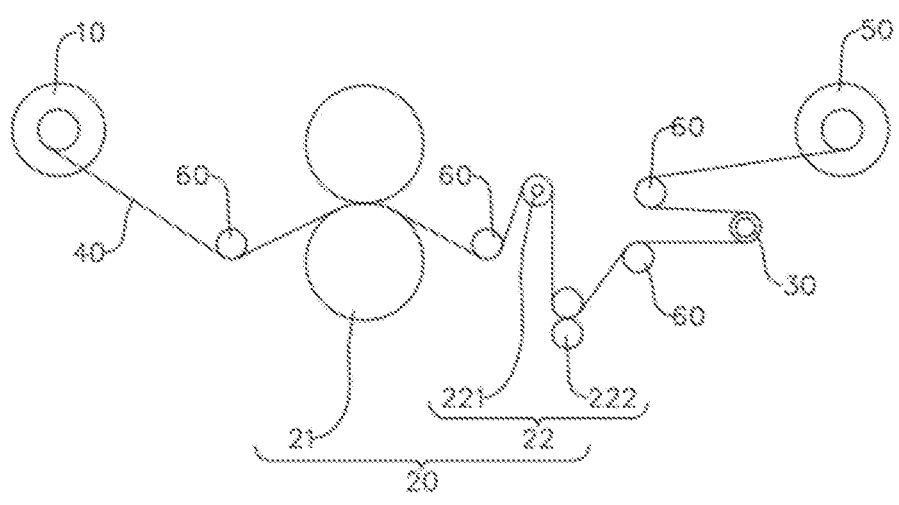
FIG. 1 is a schematic structural diagram of an electrode plate calendering apparatus according to some embodiments of the present application.

100—Electrode plate calendering apparatus; 10—Feeding device; 20—Cold-press calendering device; 21—First calendering mechanism; 22—Second calendering mechanism; 221—Calendering roller; 222—Tension clamping assembly; 30—Detection device; 31—Passing roller; 311—Annular groove; 312—Wire hole; 313—Accommodating cavity; 314—Rotating shaft; 32—Measurement unit; 321—Pressure sensor; 322—Signal processor; 33—Processing module; 34—Mounting base; 35—Conductive member; 40—Electrode plate; 50—Take-up device; 60—Transition roller.

DETAILED DESCRIPTION OF EMBODIMENTS

In order to make the objectives, technical solutions and advantages of the embodiments of the present application clearer, the technical solutions in the embodiments of the present application will be described clearly below with reference to the drawings in the embodiments of the present application. Obviously, the embodiments described are some of, rather than all of, the embodiments of the present application. All the other embodiments obtained by those of ordinary skill in the art based on the embodiments of the present application without creative efforts shall fall within the scope of protection of the present application.

Unless otherwise defined, all technical and scientific terms used in the present application have the same meanings as those commonly understood by those skilled in the art to which the present application belongs; and the terms used in the description of the present application are merely for the purpose of describing specific embodiments, but are not intended to limit the present application. The terms "comprising" and "having" and any variations thereof in the description and the claims of the present application as well as the brief description of the drawings described above are intended to cover non-exclusive inclusion. The terms "first", "second", etc. in the description and the claims of the present application as well as the foregoing drawings are used to distinguish between different objects, rather than describing a specific order or a primary-secondary relationship.

In the present application, "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skills in the art, the specific meaning of the foregoing terms in the present application may be understood according to specific circumstances.

The term "and/or" in the present application is merely a description of the associated relationship of associated objects, representing that three relationships may exist, for example, A and/or B, may be expressed as: the three instances of A alone, A and B simultaneously, and B alone. In addition, the character "/" in the present application generally indicates that the associated objects before and after the character are in a relationship of "or".

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the accompanying drawings, as well as the dimensions, such as an overall thickness, length and width, of an integrated apparatus are merely illustrative and should not be construed to limit the present application in any way.

"A plurality of" appearing in the present application means two or more (including two).

In a manufacturing process of an electrode plate, a roller press calender needs to compress the electrode plate to a certain thickness to increase an energy density per unit volume of the electrode plate, and then a tab area of the electrode plate is cut to obtain a tab, which is needed for subsequent battery production. However, due to a pressure from a pressure roller during rolling, the electrode plate becomes thinner, and is calendered to some extent in a direction parallel to a travel direction of the electrode plate. However, due to an unqualified quality of cold-press calendering of the electrode plate, it is very easy to cause batteries subsequently produced to be scrapped or to have quality problems.

The inventor has found that in the existing production process of cold-press calendering of the electrode plate, the electrode plate is first rolled, and is then tensioned, so as to calender the coated area and the tab area of the electrode plate in sequence. When the electrode plate is under-calendered or over-calendered, the electrode plate is prone to crack or wavy edges, etc., which is very easy to cause batteries subsequently produced to be scrapped or to have quality problems. Therefore, it is particularly important to detect the quality of cold-press calendering of the electrode plate. However, in the related art, it takes a lot of time to measure the cold-press calendered electrode plate, and the measurement of the electrode plate is not timely or is missed frequently, which causes the unqualified electrode plates to enter the subsequent processing process, resulting in a high scrap rate of the batteries subsequently produced.

In view of this, an embodiment of the present application provides an electrode plate calendering apparatus, which can improve the problems such as complex operation, long time-consuming and untimely detection in a method for detecting the quality of cold-press calendering of an electrode plate in the related art, thereby reducing the phenomenon of cracking or wavy edges of the electrode plate due to the under-calendered or over-calendered electrode plate, which otherwise causes the battery to be scrapped or to have a poor quality. The specific structure of the electrode plate calendering apparatus is described in detail below with reference to the accompanying drawings.

Referring to FIG. 1, FIG. 1 is a schematic structural diagram of an electrode plate calendering apparatus 100 according to some embodiments of the present application. The electrode plate calendering apparatus 100 includes a feeding device 10, a cold-press calendering device 20, and a detection device 30. The feeding device 10 is configured to provide an electrode plate 40. The cold-press calendering device 20 is disposed downstream of the feeding device 10, and the cold-press calendering device 20 is configured to cold-press calender the electrode plate 40. The detection device 30 is disposed downstream of the cold-press calendering device 20, and the detection device 30 is configured for on-line detection of the electrode plate 40 to detect the quality of cold-press calendering of the electrode plate 40.

After the feeding device 10 provides the electrode plate 40, the electrode plate 40 enters the cold-press calendering device 20 for cold-press calendering, and then enters the detection device 30 for on-line detection, so as to detect the quality of cold-press calendering of the electrode plate 40 in a timely manner, so that the result of the quality of cold-press calendering of the electrode plate 40 can be obtained in a timely and rapid manner to facilitate timely adjustment and error correction of the electrode plate calendering apparatus 100, so as to reduce the number of unqualified electrode plates 40 into the subsequent processing procedure, which is beneficial to reduce the scrap rate of the batteries.

It should be noted that the cold-press calendering device 20 is disposed downstream of the feeding device 10, that is: after coming out of the feeding device 10, the electrode plate 40 is cold-press calendered by the cold-press calendering device 20. The detection device 30 is disposed downstream of the cold-press calendering device 20, that is: the electrode plate 40 is first cold-press calendered by the cold-press calendering device 20, and is then detected by the detection device 30.

The electrode plate has a coated area coated with an active material and a tab area not coated with an active material, and one or more tab areas on the electrode plate can be provided.

In some embodiments, the electrode plate calendering apparatus 100 may further include a take-up device 50. The take-up device 50 is disposed downstream of the detection device 30, and the take-up device 50 is configured for recovering the electrode plate 40. After the electrode plate 40 is fed by the feeding device 10, the electrode plate 40 is cold-press calendered by the cold-press calendering device 20, and is then detected for the quality of cold-press calendering by the detection device 30, and is then recovered by the take-up device 50, so that the qualified electrode plate 40 after cold-press calendered is transported to a subsequent processing station for processing.

It should be noted that the take-up device 50 is disposed downstream of the detection device 30, that is: the electrode plate 40 is first detected by the detection device 30 and is then recovered by the take-up device 50.

As an example, the feeding device 10 is a feeding roller, and the take-up device 50 is a take-up roller.

In some embodiments, still referring to FIG. 1, the cold-press calendering device 20 may include a first calendering mechanism 21 and a second calendering mechanism 22. The first calendering mechanism 21 and the second calendering mechanism 22 are arranged in sequence in a conveying direction of the electrode plate 40. The first calendering mechanism 21 is configured to cold-press calender the coated area of the electrode plate 40, and the second calendering mechanism 22 is configured to tensioning calender the tab area of the electrode plate 40.

Optionally, the first calendering mechanism 21 includes two pressure rollers. The two pressure rollers are respectively disposed on two sides of the electrode plate 40 in a thickness direction, and the two pressure rollers are configured to cooperate to roll the coated area of the electrode plate 40, so as to cold-press calender the coated area of the electrode plate 40.

Optionally, the second calendering mechanism 22 includes a calendering roller 221 and a tension clamping assembly 222. The calendering roller 221 and the tension clamping assembly 222 are arranged in sequence in the conveying direction of the electrode plate 40. The calendering roller 221 is configured for the electrode plate 40 to pass over, and the tension clamping assembly 222 is configured to tension the electrode plate 40 to enable the electrode plate 40 to generate a larger tension on the calendering roller 221, so that the calendering roller 221 and the tension clamping assembly 222 cooperate to tension calender the tab area of the electrode plate 40.

As an example, the tension clamping assembly 222 includes two tension clamping rollers. The two tension clamping rollers are respectively disposed on two sides of the electrode plate 40 in the thickness direction, and the two tension clamping rollers are configured to cooperate to clamp the electrode plate 40.

In some embodiments, the electrode plate calendering apparatus 100 may further include a plurality of transition rollers 60. The plurality of transition rollers 60 are disposed at intervals in the conveying direction of the electrode plate 40, and the transition rollers 60 are configured to support the electrode plate 40.

The number of transition rollers 60 may be two, three, four, five, etc. As an example, in FIG. 1, four transition rollers 60 are provided, and the four transition rollers 60 are respectively disposed between the feeding device 10 and the first calendering mechanism 21, between the first calendering mechanism 21 and the second calendering mechanism 22, between the second calendering mechanism 22 and the detection device 30, and between the detection device 30 and the take-up device 50.

Figure 2:
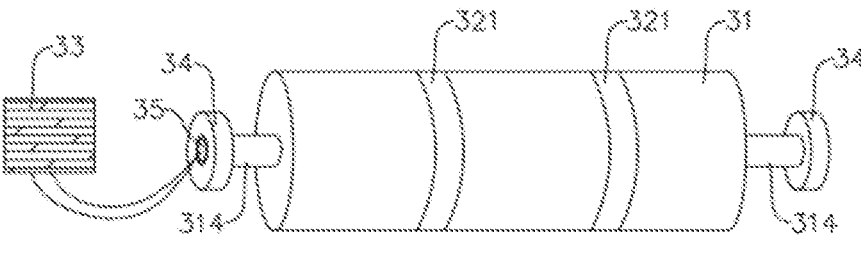
FIG. 2 is a schematic structural diagram of a detection device shown in FIG. 1.
Figure 3:
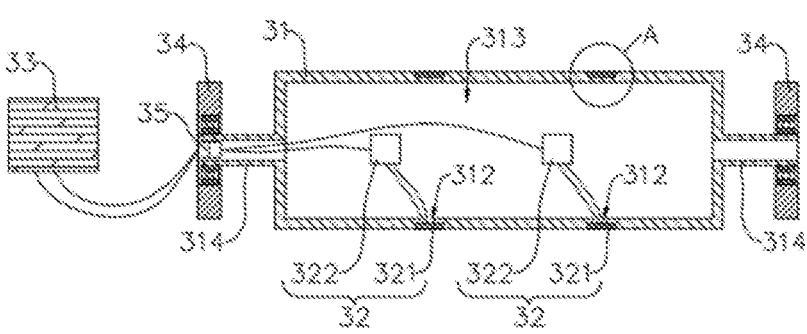
FIG. 3 is a sectional view of the detection device shown in FIG. 2.

In some embodiments, as shown in FIGS. 2 and 3, FIG. 2 is a schematic structural diagram of the detection device 30, and FIG. 3 is a sectional view of the detection device 30. The detection device 30 includes a passing roller 31, a measurement unit 32 and a processing module 33. The passing roller 31 is configured for the electrode plate 40 to pass over. The measurement unit 32 is disposed on the passing roller 31, and the measurement unit 32 is configured to measure a pressure acting on the passing roller 31 by the electrode plate 40. The processing module 33 is configured to judge whether the electrode plate 40 is qualified according to the pressure measured by the measurement unit 32.

The detection device 30 is provided with the passing roller 31 for the electrode plate 40 to pass over, and the measurement unit 32 is disposed on the passing roller 31, so that the pressure acting on the passing roller 31 when the electrode plate 40 passes over the passing roller 31 can be measured by the measurement unit 32; and the processing module 33 can judge whether the electrode plate 40 is qualified after obtaining a value of the pressure, so as to complete detection of the quality of cold-press calendering of the electrode plate 40, thereby reducing the risk such as occurrence of crack or wavy edges of the electrode plate 40 in the subsequent processing procedure due to insufficient detection. By means of the detection device 30 of this structure, an automatic on-line detection of the quality of cold-press calendering of the electrode plate 40 is realized, with a more timely detection, so that information about the quality of cold-press calendering of the electrode plate 40 can be obtained in a timely manner, so as to enable adjustment and error correction of the electrode plate 40 or the electrode plate calendering apparatus 100 to reduce the number of unqualified electrode plates 40 into subsequent processing procedure, which is beneficial to reduce the scrap rate of the batteries. In addition, the detection device 30 of this structure is less time-consuming and easily operated, without manual intervention and sampling detection, which is beneficial to improve the efficiency of detection of the quality of cold-press calendering of the electrode plate 40 and saves labor.

As an example, the passing roller 31 is disposed downstream of the second calendering mechanism 22, and the electrode plate 40 passes over the passing roller 31, so that the detection device 30 can detect the cold-press calendered electrode plate 40 in a timely manner. It should be noted that the passing roller 31 is disposed downstream of the second calendering mechanism 22, that is, the electrode plate 40 is first calendered by the second calendering mechanism 22, and then passes over the passing roller 31.

In some embodiments, the processing module 33 is configured to obtain the value of the pressure, measured by the measurement unit 32, acting on the passing roller 31 by the electrode plate 40, and compare the value of the pressure with a preset pressure value range. When the value of the pressure acting on the passing roller 31 by the electrode plate 40 is within the preset pressure value range, the quality of cold-press calendering of the electrode plate 40 is qualified; when the value of the pressure acting on the passing roller 31 by the electrode plate 40 is below the preset pressure value range, the quality of cold-press calendering of the electrode plate 40 is unqualified, and the electrode plate 40 is under-calendered; and when the value of the pressure acting on the passing roller 31 by the electrode plate 40 is above the preset pressure value range, the quality of cold-press calendering of the electrode plate 40 is unqualified, and the electrode plate 40 is over-calendered. Therefore, the processing module 33 can send an instruction signal according to the comparison result, so that an operator can adjust the electrode plate calendering apparatus 100 in a timely manner, so as to reduce the number of unqualified electrode plates 40 into the subsequent processing procedure, which is beneficial to reduce the production cost and scrap rate of the batteries.

The processing module 33 may be a programmable logic controller (PLC).

As an example, the instruction signal sent by the processing module 33 may be an alarm sound, a warning light, or an instruction command, etc., so as to prompt the operator to take timely processing.

Optionally, the measurement unit 32 is configured to measure a pressure acting on the passing roller 31 by the tab area of the electrode plate 40. The tab area of the electrode plate 40 is measured by the measurement unit 32 to obtain the pressure acting on the passing roller 31 by the tab area of the electrode plate 40, thereby detecting the quality of cold-press calendering of the tab area of the electrode plate 40 to judge whether the electrode plate 40 is qualified. By means of this detection method, the accuracy of detection of the quality of cold-press calendering of the electrode plate 40 can be improved, so as to reduce the phenomenon of cracking or wavy edges of the electrode plate 40 with unqualified quality of cold-press calendering in the subsequent processing procedure, which otherwise causes the battery to be scrapped.

In some embodiments, in a width direction of the electrode plate 40, the electrode plate 40 includes a plurality of tab areas disposed at intervals. A plurality of measurement units 32 may be provided. The plurality of measurement units 32 are arranged at intervals in an axial direction of the passing roller 31, and each measurement unit 32 is configured to measure the pressure acting on the passing roller 31 by one tab area. Providing a plurality of measurement units 32 arranged at intervals in the axial direction of the passing roller on the passing roller 31 can enable measurement of the electrode plate 40 having a plurality of tab areas, so that the detection device 30 can detect different models of electrode plates 40, which is beneficial to improve the flexibility of the detection device 30 in use.

The number of measurement units can be two, three, four, five, six, etc. As an example, as shown in FIGS. 2 and 3, two measurement units 32 are provided. The two measurement units 32 are arranged at intervals in the axial direction of the passing roller 31, and the two measurement units 32 are respectively configured to measure the pressure acting on the passing roller 31 by the tab areas on two sides of the coated area of the electrode plate 40.

In some embodiments, still referring to FIGS. 2 and 3, the measurement unit 32 may include a pressure sensor 321 and a signal processor 322. The pressure sensor 321 is disposed on the passing roller 31, and the pressure sensor 321 is configured to measure the pressure acting on the passing roller 31 by the electrode plate 40. The signal processor 322 is electrically connected to the pressure sensor 321, and the signal processor 322 is configured to generate a pressure signal according to the pressure measured by the pressure sensor 321 and transmit the pressure signal to the processing module 33. The pressure acting on the passing roller 31 by the electrode plate 40 can be measured by disposing the pressure sensor 321 on the passing roller 31, and the pressure acting on the passing roller 31 by the electrode plate 40 is then converted into a pressure signal by the signal processor 322 and is then transmitted to the processing module 33 for processing, with a simple structure, and convenience to realize.

As an example, the signal processor 322 may be a printed circuit board (PCB).

As an example, the pressure sensor 321 may be a thin film sensor, and the thin film sensor is connected to the printed circuit board by means of a wire, so as to realize the electrical connection between the thin film sensor and the printed circuit board. The pressure sensor 321 being a thin film sensor disposed on the passing roller 31, the thin film sensor having a small thickness, light weight, higher softness, and higher sensitivity, is beneficial to improve the precision of detection of the quality of cold-press calendering of the electrode plate 40; and by means of the pressure sensor 321 of this structure, it is convenient for pressure sensor to encircle the passing roller 31, and the risk of damage to the electrode plate 40 by the pressure sensor 321 can also be reduced. In other embodiments, the pressure sensor 321 may also be a combined strain and pressure sensor 321, etc.

Optionally, the pressure sensor 321 is adhered on the passing roller 31. The pressure sensor 321 is connected to the passing roller 31 by means of adhesive, with a simple structure, convenience to mount, and a high stability. In other embodiments, the pressure sensor 321 may also be connected to the passing roller 31 by means of bolting, snap-fitting, etc.

Figure 4:
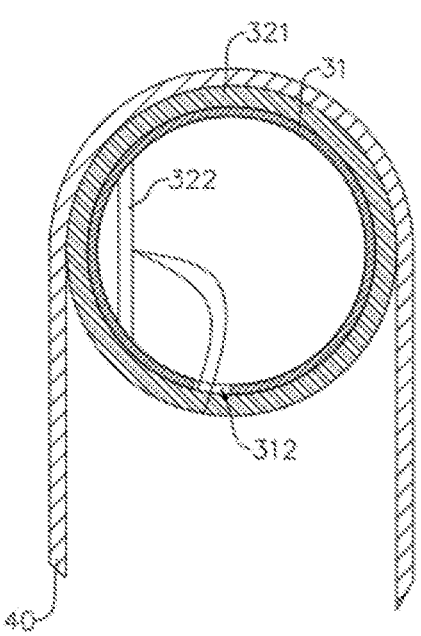
FIG. 4 is a cross-sectional view of the detection device shown in FIG. 2.

In some embodiments, as shown in FIGS. 2 and 4, FIG. 4 is a cross-sectional view of the detection device 30, and the pressure sensor 321 encircles the passing roller 31 in a circumferential direction of the passing roller 31. The pressure sensor 321 encircling the passing roller 31 enables the pressure sensor 321 to continuously measure the electrode plate 40 passing over the passing roller 31, so as to realize a real-time monitoring of the electrode plate 40 to reduce the phenomenon of missed measurement of the electrode plate 40, which is beneficial to improve the accuracy of detection of the quality of cold-press calendering of the electrode plate 40.

Figure 5:
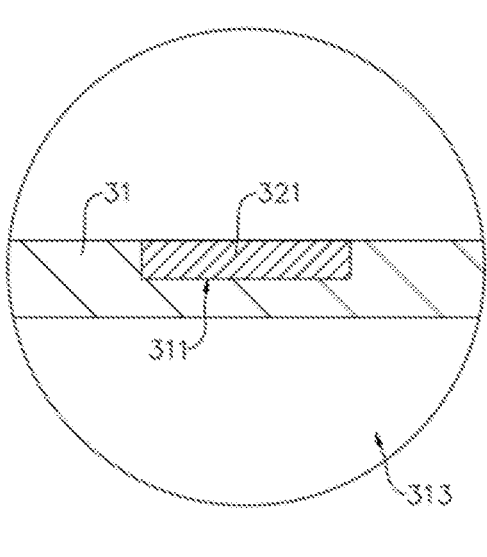
FIG. 5 is a partial enlarged view of part A in the detection device shown in FIG. 3.

Further, as shown in FIGS. 4 and 5, FIG. 5 is a partial enlarged view of the detection device 30. An annular groove 311 extending in the circumferential direction of the passing roller 31 is provided on a surface of the passing roller 31, and the pressure sensor 321 is disposed in the annular groove 311. The annular groove 311 extending in the circumferential direction of the passing roller 31 is provided on the outer peripheral surface of the passing roller 31, and the pressure sensor 321 is disposed in the annular groove 311, so that the annular groove 311 can limit the pressure sensor 321 to a certain extent, reducing the risk of axial movement of the pressure sensor 321, which is beneficial to improve the structural stability of the detection device 30. Of course, the structure of the detection device 30 is not limited thereto, and in other embodiments, the pressure sensor 321 may also encircle the outer peripheral surface of the passing roller 31. Disposing the pressure sensor 321 circumferentially on the outer peripheral surface of the passing roller 31 facilitates the measurement of the pressure acting on the passing roller 31 by the electrode plate 40, with a simple structure, convenience to mount, and a low assembly cost.

A wire hole 312 for the wires to pass through is provided in a bottom wall of the annular groove 311, so that the signal processor 322 can be electrically connected to the pressure sensor 321 by means of the wire.

Optionally, in FIG. 5, an outer peripheral surface of the pressure sensor 321 is flush with the outer peripheral surface of the passing roller 31. After the pressure sensor 321 is disposed in the annular groove 311, the outer peripheral surface of the pressure sensor 321 is disposed to be flush with the outer peripheral surface of the passing roller 31; and by means of the detection device 30 of this structure, on the one hand, it is convenient for the pressure sensor 321 to measure the pressure acting on the passing roller 31 by the electrode plate 40, and on the other hand, the abrasion on the pressure sensor 321 caused by the electrode plate 40 can be reduced, which is beneficial to prolong the service life of the pressure sensor 321 and reduce the production cost of the electrode plate 40.

It should be noted that, in other embodiments, the detection device 30 can also have other structures, for example, the pressure sensor 321 cover at least the half of the passing roller 31 in the circumferential direction of the passing roller 31, or at least two pressure measurement points are arranged circumferentially and uniformly on the outer peripheral surface of the passing roller 31 in order to realize intermittent on-line sampling measurement of the electrode plate 40.

In some embodiments, as shown in FIGS. 3 and 4, an accommodating cavity 313 is formed in the passing roller 31, and the accommodating cavity 313 is configured for accommodating the signal processor 322. The signal processor 322 is disposed in the accommodating cavity 313 of the passing roller 31, so that the pass-over roller 31 can protect the signal processor 322, which is beneficial to prolong the service life of the signal processor 322.

The signal processor 322 may be adhered to an cavity wall of the accommodating cavity 313, and in other embodiments, the signal processor 322 may also be bolted or snap-fitted on the cavity wall of the accommodating cavity 313.

Further, the detection device 30 can further include two mounting bases 34. The two mounting bases 34 are arranged at intervals in the axial direction of the passing roller 31, and the mounting bases 34 are used to be fixed on a frame. Rotating shafts 314 are provided at two ends of the passing roller 31 in its axial direction, and each rotating shaft 314 is rotatably connected to one mounting base 34. The rotating shaft 314 is of hollow structure with two open ends, and the rotating shaft 314 is in communication with the accommodating cavity 313 of the passing roller 31.

As an example, the rotating shaft 314 may be rotatably connected to the mounting base 34 by means of a bearing, the rotating shaft 314 is in interference fit with an inner race of the bearing, and the mounting base 34 is in interference fit with an outer race of the bearing.

Optionally, the signal processor 322 may be wirelessly connected to the processing module 33 by means of a wireless communicator, so that the signal processor 322 transmits the pressure signal to the processing module 33, or may be electrically connected by means of a wire, so that the signal processor 322 can transmit the pressure signal to the processing module 33. In this embodiment, in FIG. 3, the signal processor 322 is electrically connected to the processing module 33 by means of the wire.

The detection device 30 may further include a conductive member 35. The conductive member 35 includes a first connector and a second connector. The second connector is rotatably disposed on the first connector, the first connector is fixedly disposed on the passing roller 31, and the signal processor 322 is electrically connected to the first connector, the first connector is electrically connected to the second connector, and the second connector is electrically connected to the processing module 33.

The signal processor 322 is electrically connected to the processing module 33 by means of the conductive member 35, the conductive member 35 is provided with the first connector and the second connector that are electrically connected to each other and can rotate relative to each other, and the first connector is mounted on the passing roller 31, such that the first connector can rotate with the passing roller 31, and the second connector will not rotate with the passing roller 31, so that by means of the detection device 30 of this structure, it can be ensured that the signal processor 322 is always electrically connected to the processing module 33 in the process of rotation with the passing roller 31, and the risk of tangling of wires between the signal processor 322 and the processing module 33 can be reduced.

As an example, the conductive member 35 is a rotating conductive slip ring.

It should be noted that the embodiments in the present application and features in the embodiments may be combined with each other without conflicts.

The foregoing descriptions are merely some embodiments of the present application, and are not intended to limit the present application. For those skilled in the art, various modifications and variations may be made to the present application. Any modifications, equivalent substitutions, improvements, and the like made within the spirit and principle of the present application should fall within the scope of protection of the present application.

What is claimed is:

1. A detection device, comprising:
   a passing roller configured for an electrode plate to pass over, the passing roller comprising a hollow cylindrical structure with an accommodating cavity inside the hollow cylindrical structure, two rotating shafts being provided at two ends of the passing roller in an axial direction, each of the two rotating shafts being of a hollow structure with two open ends, and each of the two rotating shafts being in communication with the accommodating cavity of the passing roller;

a measurement unit disposed on the passing roller, configured to measure a pressure acting on the passing roller by the electrode plate, and comprising:
   a pressure sensor disposed on the passing roller, and configured to measure the pressure acting on the passing roller by the electrode plate; and
   a signal processor electrically connected to the pressure sensor, located inside the accommodating cavity, and adhered to an inner wall of the accommodating cavity the signal processor being configured to obtain the pressure measured by the pressure sensor, convert the pressure to a pressure signal, and transmit the pressure signal to a processing module;

the processing module configured to receive the pressure signal transmitted by the signal processor, obtain the pressure measured by the measurement unit based on the received pressure signal, and compare a value of the pressure with a preset pressure value range; and a conductive member entirely disposed inside the hollow structure of one of the two rotating shafts, and comprising a first connector and a second connector, the second connector being rotatably disposed on the first connector, the first connector being fixedly disposed on the rotating shaft, the signal processor being electrically connected to the first connector, the first connector being electrically connected to the second connector, and the second connector being electrically connected to the processing module.

2. The detection device according to claim 1, wherein the signal processor is configured to generate a pressure signal according to the pressure measured by the pressure sensor and transmit the pressure signal to the processing module.

3. The detection device according to claim 1, wherein the pressure sensor encircles the passing roller in a circumferential direction of the passing roller.

4. The detection device according to claim 3, wherein an annular groove extending in the circumferential direction of the passing roller is provided on a surface of the passing roller, and the pressure sensor is disposed in the annular groove.

5. The detection device according to claim 4, wherein an outer peripheral surface of the pressure sensor is flush with an outer peripheral surface of the passing roller.

6. The detection device according to claim 3, wherein the pressure sensor is disposed on an outer peripheral surface of the passing roller.

7. The detection device according to claim 1, wherein the pressure sensor is adhered to the passing roller.

8. The detection device according to claim 1, wherein the pressure sensor is a thin film sensor.

9. The detection device according to claim 1, wherein:
   the electrode plate comprises a coated area coated with an active material and a tab area not coated with an active material; and
   the measurement unit is configured to measure a pressure acting on the passing roller by the tab area.

10. The detection device according to claim 9, wherein:
   the tab area is one of a plurality of tab areas disposed at intervals in a width direction of the electrode plate; and the measurement unit is one of a plurality of measurement units of the detection device, the plurality of measurement units are arranged at intervals in an axial direction of the passing roller, and each measurement unit is configured to measure the pressure acting on the passing roller by one tab area.

11. An electrode plate calendering apparatus, comprising:

a feeding device configured to provide an electrode plate;

a cold-press calendering device disposed downstream of the feeding device, and configured to cold-press calender the electrode plate; and a detection device disposed downstream of the cold-press calendering device, and comprising:

a passing roller configured for the electrode plate to pass over, the passing roller comprising a hollow cylindrical structure with an accommodating cavity inside the hollow cylindrical structure, two rotating shafts being provided at two ends of the passing roller in an axial direction, each of the two rotating shafts being of a hollow structure with two open ends, and each of the two rotating shafts being in communication with the accommodating cavity of the passing roller;

a measurement unit disposed on the passing roller, configured to measure a pressure acting on the passing roller by the electrode plate, and comprising:

a pressure sensor disposed on the passing roller, and configured to measure the pressure acting on the passing roller by the electrode plate; and a signal processor electrically connected to the pressure sensor, located inside the accommodating cavity, and adhered to an inner wall of the accommodating cavity, the signal processor being configured to obtain the pressure measured by the pressure sensor, convert the pressure to a pressure signal, and transmit the pressure signal to a processing module;

the processing module configured to receive the pressure signal transmitted by the signal processor, obtain the pressure measured by the measurement unit based on the received pressure signal, and compare a value of the pressure with a preset pressure value range; and a conductive member entirely disposed inside the hollow structure of one of the two rotating shafts, and comprising a first connector and a second connector, the second connector being rotatably disposed on the first connector, the first connector being fixedly disposed on the rotating shaft, the signal processor being electrically connected to the first connector, the first connector being electrically connected to the second connector, and the second connector being electrically connected to the processing module.

12. The electrode plate calendering apparatus according to claim 11, further comprising:

a transition roller disposed between the cold-press calendering device and the detection device.

13. The electrode plate calendering apparatus according to claim 11, wherein the cold-press calendaring device comprises two pressure rollers respectively disposed on two sides of the electrode plate in a thickness direction.

14. A detection device, comprising:

a passing roller configured for an electrode plate to pass over, an annular groove extending in the circumferential direction of the passing roller being provided on a surface of the passing roller, a wire hole being provided in a bottom wall of the annular groove the passing roller comprising a hollow cylindrical structure with an accommodating cavity inside the hollow cylindrical structure, two rotating shafts being provided at two ends of the passing roller in an axial direction, each of the two rotating shafts being of a hollow structure with two open ends, and each of the two rotating shafts being in communication with the accommodating cavity of the passing roller;

a measurement unit disposed on the passing roller, configured to measure a pressure acting on the passing roller by the electrode plate, and comprising:

a pressure sensor disposed in the annular groove, and configured to measure the pressure acting on the passing roller by the electrode plate; and a signal processor electrically connected to the pressure sensor via a wire passing through the wire hole, and configured to obtain the pressure measured by the pressure sensor, convert the pressure to a pressure signal, and transmit the pressure signal to a processing module;

the processing module configured to receive the pressure signal transmitted by the signal processor, obtain the pressure measured by the measurement unit based on the received pressure signal, and compare a value of the pressure with a preset pressure value range; and a conductive member entirely disposed inside the hollow structure of one of the two rotating shafts, and comprising a first connector and a second connector, the second connector being rotatably disposed on the first connector, the first connector being fixedly disposed on the rotating shaft, the signal processor being electrically connected to the first connector, the first connector being electrically connected to the second connector, and the second connector being electrically connected to the processing module.

* * * * *